Dec. 25, 1934.  A. L. RAVEN  1,985,461
MOTION PICTURE SCREEN
Original Filed Aug. 25, 1928
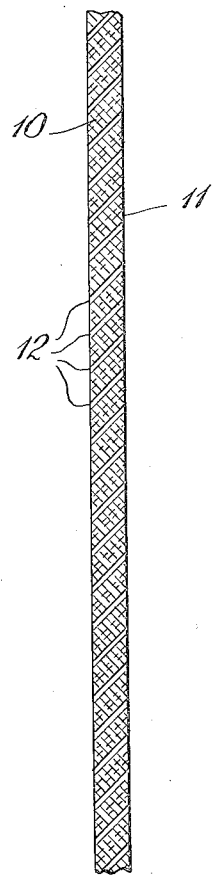
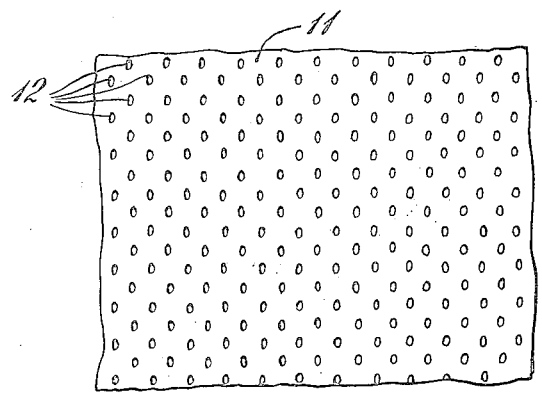
INVENTOR
Albert L. Raven
BY
his ATTORNEYS Patented Dec. 25, 1934

1,985,461

UNITED STATES PATENT OFFICE 1,985,461

MOTION PICTURE SCREEN

Albert L. Raven, Mount Vernon, N. Y.

Original application August 25, 1928, Serial No. 302,048. Divided and this application February 1, 1930, Serial No. 425,154

3 Claims. (Cl. 88—24)

This invention relates to moving picture screens and has for its object the provision of certain improvements in moving picture screens. More particularly, the invention aims to provide a screen for motion pictures which will admit of the passage therethrough of sound waves and at the same time present to the spectators a highly reflective and diffusing surface.

In a heretofore customary manner of making reflecting motion picture screens the foundation or base of the screen is composed of some dense material, preferably of such a nature that little, if any, light may be transmitted therethrough, the primary object being to obtain a front surface which will reflect toward the spectators a maximum quantity of light without the production of a glare as would be produced by a mirrored surface. Various means are utilized to obtain this result; one way of obtaining this is disclosed in my prior Patent No. 1,315,743, dated September 9, 1919.

With the advent of talking motion pictures, such for example, as the Vitaphone, it has been found that when large screens are used with the sound producing horn placed at one side of the screen, the voice or music does not appear to emanate from the logical source of the sound, that is, the picture projected on the screen. This effect is particularly noticeable when an actor in a picture is speaking while in a position adjacent to one margin of the picture, while the horn of the Vitaphone is located near the opposite margin of the screen. This effect is not noticeable enough to be disturbing to those seated in the centre of the theatre and at a considerable distance from the screen. It, however, is very pronounced to one sitting at the side of the theatre at a considerable angle to the screen.

In order to overcome this defect it is necessary to replace the usual opaque screen with a porous cloth screen locating the Vitaphone speaker directly behind the screen. The porous nature of the cloth screen permits the passage therethrough of the sound waves and as a consequence the sound appears to emanate from the projected picture upon the screen. This method has the very serious defect that due to the porous translucent nature of the cloth screen a great portion (about 40%) of the light projected thereon passes through the screen and is lost, thus the illumination of the picture is proportionately reduced. In order to compensate for this, it is proposed to increase the candle power of the projection apparatus. This, however, means a substantial increase in the current consumption which substantially increases the cost of operation of a small theatre where the Vitaphone is run continuously with the showing of the picture film. Increasing the candle power of the projection apparatus also increases the danger of burning or damaging the film as it passes through the projection machine. In case the Vitaphone is only used occasionally and it is desired to save current, it would be necessary to use two screens of the type heretofore available.

I have discovered that a motion picture projection screen may be made which will reflect and diffuse a large portion of the projected light and at the same time permit the free passage therethrough of air and like gases and air carried sound waves. In the practice of the invention a foraminous screen is constructed with the perforations or holes passing through the screen at an acute angle to the plane of the screen. It is advantageous to have these holes so disposed that they slant downwardly toward the back of the screen. The disposition of the holes in this manner prevents the direct rays of light from the projection apparatus from passing through the holes in the screen and becoming lost. Holes slanted upwardly toward the back of the screen might be aligned directly with spectators and would consequently appear as minute dots on the surface of the screen. However, because of the tiny size of these holes in proportion to their spacing from one another and because of their uniform distribution over the entire surface of the screen, they are not sufficiently visible to interfere with the successful projection of the picture upon the screen.

Another advantage gained by running the holes obliquely downward toward the back of the screen is that the light from the projection apparatus illuminates the entire back of the hole which is visible to the spectators; therefore the total illumination of the screen is reduced but slightly by the presence of the perforations.

In practicing the invention in a manner which will secure all of its advantages, it has been found advantageous to increase somewhat the thickness of the screen to prevent loss of light through the perforations of the foraminous structure of the screen. In case the body of the screen is made of material which has poor reflecting qualities and in which the reflecting surface comprises a specially compounded film or coating, it has been found advantageous to form the perforations prior to the application of the reflecting film. This procedure permits the reflecting film to be applied to the exposed surface of the holes in a manner similar to its application to the surface of the screen.

The invention will be better understood from a consideration of the accompanying drawing together with the following description. In the drawing:

Fig. 1 is a section through a small portion of screen made in accordance with the invention, and Fig. 2 is a front elevation of a small fragment of the screen illustrated in Fig. 1.

The screen comprises a body 10, of any appropriate material. The front surface 11, which is presented to the spectators, may be slightly roughened in any desired manner to give better diffusion of the reflected light. Thus the screen may be made as described in my prior patent above referred to. The body 10 of the screen is pierced by holes or perforations 12, which preferably slant downwardly from the front 18 of the screen toward the back. Thus, the holes which appear on the surface of the screen do not appear to the spectator as black dots with no illumination. The source of light from the projection machine illuminates the back portions of the holes and a large proportion of this light is reflected out toward the spectators. Only a minor portion of reflected light finds its way through the slanting holes 12 and emerges at the back of the screen. Preferably the holes 12 should have their front orifices higher than the rear orifices. Although in order to meet certain conditions, this relationship of the orifices may be reversed.

It will be noticed from Figs. 1 and 2 that the screen presents a picture receiving surface which is dotted with tiny holes distributed uniformly over the area of the surface. If the sound passages slant downwardly from the front of the screen no shadows will be cast by any part of the intersections of these passages with the surface of the screen. However, if the screen be turned upside down so that the passages slant upwardly from the front surface, then shadows will be cast within each of the passages.

In spite of this, however, the tiny passages are not noticeable to the audience because of their small size relative to their spacing, and yet the passages are ample for the successful transmission of sound through the screen. Thus the principal object of the invention is to provide a screen which will effectively transmit the sound from the rear of the screen and in which the sound holes are not sufficiently visible to interfere to a practicable extent with the showing of the picture.

Either side of the screen may thus be used as the front or reflecting surface depending largely upon whether it is desirable to have the sound waves projected downwardly or upwardly as they leave the front of the screen. The question of whether the sound transmitting openings shall slant upwardly or downwardly depends also largely upon the design of the theatre in which the screen is to be used. The deciding factors are the distance of the screen from the spectators and the relative position of the projecting apparatus, screen and spectators.

It is not necessary although it may be desirable, that the material of the body of the screen shall be of a light colored nature, for the surface of the screen after it is formed may be painted with a suitable coating of light reflecting material, such or instance as aluminum paint, the customary white paint and the like. These coatings, however, are not so desirable as a screen in which the body itself is composed of a good light reflecting medium, as for example is shown in my prior patent, and it is usually found advantageous to construct the body of the screen of this type of material.

The improved screen has the advantage, among other things, of simplicity and cheapness, and the small size and relatively large spacing of the holes makes it difficult to see the holes. Yet even such small holes uniformly arranged over the surface of the screen permit the passage of sound in such volume that the screen is entirely practical.

This application is a division of my copending application Serial No. 302,048, filed August 25, 1928.

I claim:

1. A sound transmitting picture screen for use in producing pictures accompanied by sound, comprising sheet material having a myriad of tiny unobstructed sound passages therethrough, these tiny passages being distributed uniformly over the area of the screen surface and spaced from one another a comparatively great distance in proportion to their size, said passages being arranged obliquely to the plane of the screen, the thickness of the screen, the diameter of the holes, and the obliquity of the passages being so correlated as to prevent loss of at least a portion of the light entering the passages.

2. A sound transmitting picture screen for use in producing pictures accompanied by sound comprising a continuous sheet of material having a plane light reflecting surface to receive the projected picture and provided with a myriad of small, parallel sided holes for the transmission of sound, these sound passages being distributed over the area of the screen surface and spaced from one another a comparatively great distance in proportion to their size, said passages being arranged obliquely to the plane of the screen, the thickness of the screen, the diameter of the holes, and the obliquity of the passages being so correlated as to prevent loss of at least a portion of the light entering the passages.

3. A sound-transmitting picture screen for use in producing pictures accompanied by sound comprising a single sheet of material having a plane light-reflecting surface, and being perforated with small unobstructed parallel-sided holes distributed over the area of the screen in sufficient number to provide ample transmission of sound through the screen substantially without distortion, while at the same time being spaced from one another a comparatively great distance in proportion to their size thereby preserving the light-reflecting properties of the screen sufficiently to exhibit an acceptable picture.

ALBERT L. RAVEN.